United States Patent
Cherigui et al.

(10) Patent No.: US 9,547,915 B2
(45) Date of Patent: *Jan. 17, 2017

(54) INTER-IMAGE PREDICTION METHOD AND DEVICE AND CORRESPONDING CODING METHOD AND APPARATUS

(71) Applicant: THOMSON LICENSING, Issy de Moulineaux (FR)

(72) Inventors: Safa Cherigui, Villeurbannes (FR); Alain Martin, Rennes (FR); Dominique Thoreau, Cesson Sevigne (FR); Philippe Guillotel, Vern sur Seiche (FR); Christine Guillemot, Chantepie (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/210,380

(22) Filed: Mar. 13, 2014

(65) Prior Publication Data

US 2014/0314330 A1 Oct. 23, 2014

(30) Foreign Application Priority Data

Mar. 19, 2013 (FR) ...................... 13 52412

(51) Int. Cl.
*G06K 9/36* (2006.01)
*G06T 9/00* (2006.01)
(Continued)

(52) U.S. Cl.
CPC ............... *G06T 9/00* (2013.01); *H04N 19/105* (2014.11); *H04N 19/136* (2014.11);
(Continued)

(58) Field of Classification Search
CPC ............. G06T 9/00; G06T 9/004; H04N 7/50; H04N 7/26015; H04N 7/34; H04N 7/26244

See application file for complete search history.

(56) References Cited

U.S. PATENT DOCUMENTS

| 7,028,271 B2* | 4/2006 | Matsugu | G06K 9/00281 382/181 |
| 8,724,701 B1* | 5/2014 | Covell | H04N 19/23 375/240.08 |

(Continued)

FOREIGN PATENT DOCUMENTS

| EP | 2154901 | 2/2010 |
| EP | 2627086 | 8/2013 |

(Continued)

OTHER PUBLICATIONS

Bevilacqua et al: "Neighbor embedding based single-image super-resolution using Semi-Nonnegative Matrix Factorization"; 2012 IEEE Int'l Conference on Acoustics, Speech and Signal Processing, Mar. 25-30, 2012, pp. 1289-1292.

(Continued)

*Primary Examiner* — Amir Alavi
(74) *Attorney, Agent, or Firm* — Tutunjian & Bitetto, P.C.

(57) ABSTRACT

The invention relates to a method for predicting a pixel block of an image using a weighted sum of pixel blocks belonging to patches of a dictionary from a set of candidate patches, each patch being formed of a pixel block of an image and a causal neighborhood of this pixel block. The method is wherein a subset of candidate patches is obtained from the set of candidate patches and the dictionary is formed of a patch of the subset of candidate patches, called the first patch, and at least one other patch of said set of candidate patches, called the second patch.

15 Claims, 4 Drawing Sheets

(51) Int. Cl.
    H04N 19/105    (2014.01)
    H04N 19/176    (2014.01)
    H04N 19/61     (2014.01)
    H04N 19/593    (2014.01)
    H04N 19/136    (2014.01)
(52) U.S. Cl.
    CPC ......... *H04N 19/176* (2014.11); *H04N 19/593* (2014.11); *H04N 19/61* (2014.11)

(56) References Cited

U.S. PATENT DOCUMENTS

| | | | |
|---|---|---|---|
| 8,805,104 B1* | 8/2014 | Covell | H04N 19/97 375/240.01 |
| 2005/0063596 A1* | 3/2005 | Yomdin et al. | 382/232 |
| 2005/0083540 A1* | 4/2005 | Hersch et al. | 358/1.9 |
| 2011/0142358 A1* | 6/2011 | Katou et al. | 382/238 |
| 2013/0136372 A1* | 5/2013 | Thoreau et al. | 382/233 |
| 2014/0314330 A1* | 10/2014 | Cherigui et al. | 382/238 |
| 2015/0264348 A1* | 9/2015 | Zou | H04N 19/105 375/240.02 |
| 2015/0264392 A1* | 9/2015 | Thoreau | H04N 19/105 382/236 |

FOREIGN PATENT DOCUMENTS

| WO | WO2013104585 | 7/2013 |
|---|---|---|
| WO | WO2014048946 | 4/2014 |

OTHER PUBLICATIONS

Turkan et al:"Image prediction based on neighbor-embedding methods" IEEE Transactions on Image Processing; vol. 21, n° 4,Apr. 1, 2012, pp. 1885-1898.
S. Cherigui etal: "Map-Aided Locally Linear Embedding methods for image prediction"; IEEE International Conference on Image Processing (ICIP), 2012; pp. 2909-2912.
Wiegand etal: "Overview of the H.264/AVC" Circuits and Systems for Video Technology, IEEE Transactions, vol. 13-7, pp. 560-576, Jul. 2003.
The Search Report dated Dec. 6, 2013.
Alain et al., "Locally Linear Embedding Methods for Inter Image Coding", 2013 IEEE International Conference on Image Processing, ICIP 2013, Melbourne, Australia, Sep. 15, 2013, pp. 1-5.
Buades et al., "A non-local algorithm for image denoising", 2005 IEEE Computer Society Conference on Computer Vision and Pattern Recognition, Jun. 20, 2005, pp. 60-65.
Criminisi et al., "Region Filling and Object Removal by Exemplar-Based Image Impainting", IEEE Transactions on Image Processing, vol. 13, No. 9, Sep. 2004, pp. 1-13.
Ikoloda et al., "Sequential Error Concealment for Video/Images by Weighted Template Matching", 2012 Data Compression Conference, Snowbird, Utah, USA, Apr. 10, 2012, pp. 159-168.
Imoinard et al., "A Set of Template Matching Predictors for Intra Video Coding", 2010 IEEE International Conference on Acoustic Speech and Signal Processing, Dallas, Texas, USA, Mar. 14, 2010, pp. 1422-1425.
Roweis et al., "Nonlinear Dimensionality Reduction by Locally Linear Embedding", Science, vol. 290, Dec. 22, 2000, pp. 2323-2326.
Song et al., "Efficient Multi-Hypothesis Error Concealment Technique for H.264", 2007 IEEE International Symposium on Circuits and Systems, New Orleans, Louisiana, USA, May 27, 2007, pp. 973-976.
Sugimoto et al., "Interframe Coding With Template Matching Spatio-Temporal Prediction", 2004 International Conference on Image Processing, Oct. 24, 2004, pp. 465-468.
Suzuki et al., "Interframe Coding With Template Matching Averaging", 2007 IEEE International Conference on Image Processing, San Antonio, Texas, USA, Sep. 2007, pp. 409-412.
Tan et al., "Intra Prediction by Template Matching", 2006 IEEE International Conference on Image Processing, Atlanta, Georgia, Oct. 8, 2006, pp. 1693-1696.
Vatis et al., "Motion- and Aliasing-Compensated Prediction using a Two-Dimensional Non-Separable Adaptive Wiener Interpolation Filter", 2005 IEEE International Conference on Image Processing, Sep. 11, 2005, pp. 894-897.
Amon et al., "Intra prediction for lossless coding", Joint Collaborative Team on Video Coding (JCT-VC) of ITU-T SG 16 WP 3 and ISO/IEC JTC 1/SC 29/WG 11, 12th Meeting, Geneva, Switzerland, Jan. 2013, pp. 1-7.
Bjontegaard, G., "Calculation of average PSNR differences between RD-curves", Document VCEG-M33, Study Group 16 Question 6, Video Coding Experts Group (VCEG), 13th Meeting, Austin, Texas, USA, Apr. 2, 2001, 99. 1-4.
International Standard ISO/IEC 14496-10, "Information technology—Coding of audio-visual objects—Part 10: Advanced Video Coding", Second Edition, Dec. 15, 2005, pp. 1-20.
Bross et al., "High Efficiency Video Coding (HEVC) text specification draft 9", Joint Collaborative Team on Video Coding (JCT-VC) of ITU-T SG16 WP3 and ISO/IEC JTC1/SG29/WG11, 11th Meeting, Shanghai, China, Oct. 10, 2012, pp. 1-292.
Cherigui et al. "Hybrid template and block matching algorithm for image intra prediction", 2012 IEEE International Conference on Acoustics, Speech, and Signal Processing (ICASSP), Kyoto, Japan, Mar. 25, 2012, pp. 781-784.

* cited by examiner

INTER-IMAGE PREDICTION METHOD AND DEVICE AND CORRESPONDING CODING METHOD AND APPARATUS

This application claims the benefit, under 35 U.S.C, §119 of French Patent Application 1352412, filed Mar. 19, 2013.

1. FIELD OF THE INVENTION

The invention relates to the general field of image coding and more specifically to that of inter-image prediction.

2. PRIOR ART

Inter-image prediction consists in taking advantage of the temporal redundancies which exist between consecutive images of a video in order to obtain high compression rates for this video.

The principle of inter-image prediction consists in dividing a current image into blocks or macroblocks. Then, the coder finds a similar block in another (previous or future) image of the video. This other image is usually called the reference image. The coder then encodes a motion vector which defines the position of the block found in said reference image(s) from the block to be predicted. The coder then calculates the difference between these two blocks and codes the prediction error. The motion vector and the prediction error are then transmitted to the decoder which can thus reconstruct the block.

A great many video coding/decoding schemas which use this type of method are known. For example, the MPEG-2 (ISO/IEC JTC1/SC29/WG11 MPEG00/October 2000, Coding of moving pictures and audio), MPEG-4/AVC (T. Wiegand, G. J. Sullivan, G. Bjontegaard, and A. Luthra, "Overview of the H.264/AVC" Circuits and Systems for Video Technology, IEEE Transactions, Vo13, 7, 560-576, July 2003) or HEVC (ITU-T Q.6/SG and ISO/IEC Moving Picture Experts Group (ISO/IEC JTC 1/SC 29/WG 11)) standards.

The definition of the blocks (or more generally of the zones) for predicting a block is decisive for the effectiveness of the coding. In fact, if the contents of the current block and the prediction block are very different, the prediction error will be significant which will lead to a significant number of bits for coding this prediction error.

It is therefore necessary to minimise the risks of choosing prediction zones far removed in terms of content from the block to be predicted.

Moreover, in a context of transmission between a transmitter and a receiver, the cost of coding the syntax elements required by the remote decoder to reconstruct a predicted image is relatively high. For example, in the case of the MPEG-4/AVC standard, the reference images are grouped together in two lists: that grouping together (decoded or reconstructed) images temporally previous to an image to which belongs the block to be predicted and that grouping together temporally subsequent (decoded or reconstructed) images. Hereafter, when temporally previous and/or subsequent images are referred to, it is implied that these images are decoded and reconstructed. Thus, to designate a block of a reference image, it is necessary to transmit to a decoder an item of information to designate one of the two lists of images, an item of information to indicate an index of a (reference) image in this list and a last item of information to indicate the coordinates of the block in the reference image.

In order to minimise the cost of coding the information transmitted to the decoder in the case of a coding method using a temporal prediction, the inventors have proposed predicting a pixel block of an image using a weighted sum of pixel blocks belonging to patches of a dictionary from a set of candidate patches, each patch being formed of a pixel block of an image and a causal neighbourhood of this pixel block (S. Chemgui, C Guillemot, D. Thoreau, P. Guillotel, "Map-Aided Locally Linear Embedding methods for image prediction" proceeding p 2909-2012, IEEE International Conference on Image Processing (ICIP), 2012).

More specifically, this method consists in defining a dictionary from a candidate patch, called the first patch, which is close, in terms of content, to the patch formed of the pixel block to be predicted and a causal neighbourhood of this block and at least one other patch, called the second patch, which is close in terms of content to the first patch. A prediction of the causal neighbourhood of the pixel block to be predicted is then determined using a weighted linear combination of neighbourhoods of the patches of this dictionary, weighting parameters which optimise the prediction are then chosen, and the pixel block of the image is then predicted using a weighted linear combination of the pixels of the blocks of the dictionary, the weighting parameters of said linear combination being those optimal ones which were determined during the neighbourhood prediction.

This method is advantageous as the prediction error for the block is reduced as the weighting parameters are defined to minimise a prediction error for a zone (neighbourhood) situated around the block to be predicted and not directly a prediction error for this block thus favouring a continuity of the content of the images.

Moreover, the information transmitted to the decoder is limited to an item of information which uniquely defines the first patch as once known by the decoder, the decoder can thus define the dictionary in an identical manner to that of the coder as this dictionary (the patches) all belong to the reconstructed part of the image. The decoder can thus calculate the weighting parameters used for the prediction of the block on the coder side and thus obtain the prediction block in a similar manner to that obtained by the coder.

As can be understood, this method reduces the cost of coding with respect to those of the standards such as MPEG-4/AVC as the syntax elements which it is necessary to transmit to the decoder with these standards no longer have to be transmitted.

Only an item of information which uniquely defines the first patch with respect to the patch formed of the pixel block to be predicted and a neighbourhood which is causal of this block must be transmitted. This item of information is usually a motion vector which is represented by an index of a table grouping together all the candidate patches belonging in a search window. As the search window must be of large size to maximise the variety of content of the candidate patches, the dynamic range of this index requires a relatively large number of coding bits as the number of candidate patches is large.

3. SUMMARY OF THE INVENTION

The purpose of the invention is to overcome at least one of the disadvantages of the prior art and notably to minimise the cost of coding the information which defines the first patch of a dictionary used in a temporal prediction method such as described in the introductory section.

For this purpose, the invention relates to a method for predicting a pixel block of an image using a weighted sum of pixel blocks belonging to patches of a dictionary from a set of candidate patches, each patch being formed of a pixel block of an image and a causal neighbourhood of this pixel block. This method is characterised in that a subset of candidate patches is obtained from the set of candidate patches and the dictionary is formed of a patch of the subset of candidate patches, called the first patch, and at least one other patch of said set of candidate patches, called the second patch.

The choice of the first patch of the dictionary from among a reduced number of candidate patches, compared with that of the set of candidate patches used to choose the other patches of this dictionary, makes it possible to obtain a reduced coding cost compared with that obtained in the standard way when this first patch is chosen from among the set of candidate patches.

According to a variant of the method, the first patch is a patch whose neighbourhood is close, in terms of content, to the neighbourhood of the patch comprising the block to be predicted, and according to another variant, which is preferentially combined with the preceding one, each second patch of the dictionary is close, in terms of content, to the first patch of this dictionary.

According to an embodiment, the neighbourhood of each candidate patch of said subset is close, in terms of content, to the neighbourhood of the patch comprising the block to be predicted.

According to an embodiment, only the patches which belong to a search window defined over one or more images are considered as candidate patches.

According to another of its aspects, the invention relates to a method for coding and/or decoding an image sequence during which a prediction block is calculated from an image pixel block. The method for coding and/or decoding is characterised in that the prediction block is calculated according to a method above.

According to another of its aspects, the invention relates to a device for predicting a pixel block of an image configured to predict said block using a weighted sum of pixel blocks belonging to patches of a dictionary from a set of candidate patches. Each patch being formed of a pixel block of an image and a causal neighbourhood of this pixel block, the device is characterised in that it also comprises:

means for obtaining a subset of candidate patches from the set of candidate patches and means for forming at least one dictionary from a patch of the subset of candidate patches and at least one other patch of said set of candidate patches, and means configured to implement one of the method above.

According to another of its aspects, the invention relates to a frame of a signal intended to be transmitted or received by a device above. The frame is characterised in that is carries an item of information which identifies the position of the first patch of the dictionary from which originates the prediction of the pixel block to be predicted.

According to an embodiment of the device, the invention relates to a device above which is characterised in that it also comprises means for transmitting and/or receiving a signal whose frame is described above.

According to another of its aspect, the invention relates to an apparatus for coding and/or decoding an image sequence which is characterised in that it comprises a device above.

4. LIST OF FIGURES

The invention will be better understood and illustrated by means of non-restrictive embodiments and advantageous implementations, with reference to the accompanying drawings, wherein:

FIG. 1 gives an example of defining a causal neighbourhood;

Figure 7:
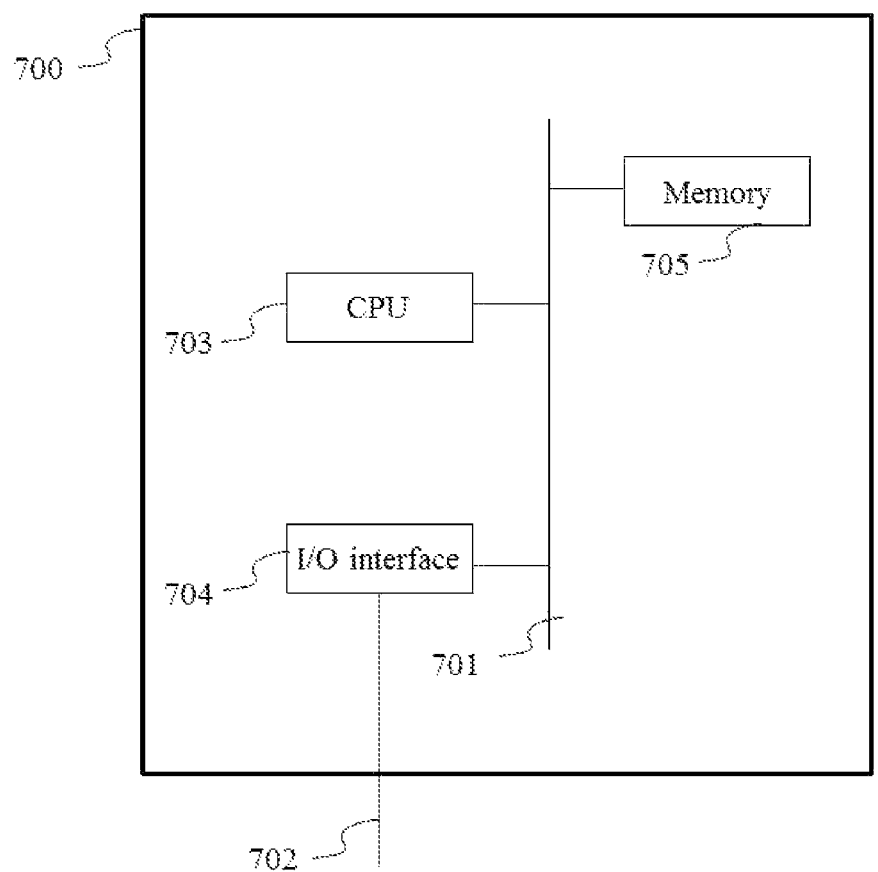

FIG. 7 diagrammatically shows an example of the architecture of a device implementing the invention.

5. DETAILED DESCRIPTION OF THE INVENTION

Hereafter, the term patch, denoted $X_k$, will be used to designate a grouping of pixels of a block $B_k$ and pixels of a neighbourhood $V_k$ of this block $B_k$. The neighbourhood $V_k$ is causal of this block $B_k$ and has an identical form to that of a neighbourhood V situated around a pixel block B to be predicted. The causality of a neighbourhood with respect to a pixel block indicates that the pixel values are known prior to the prediction of this block. The patch X is also used hereafter to designate the grouping of pixels of the pixel block to be predicted B and pixels of the neighbourhood V.

Figure 1:
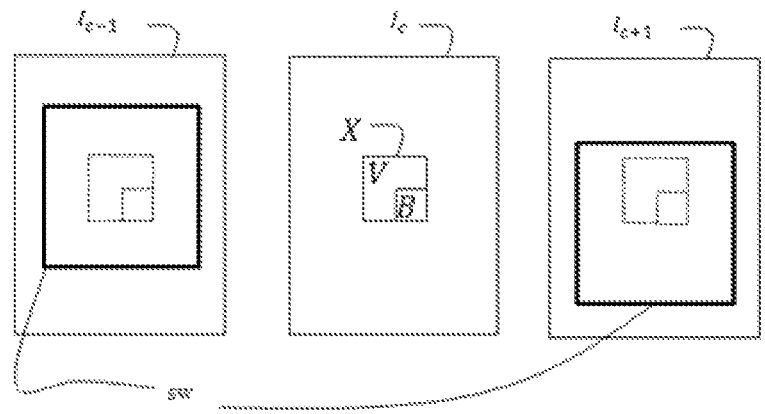

FIG. 1 gives an example of defining a causal neighbourhood. According to this example, the neighbourhood V is formed, for example, of three blocks situated to the left and above the pixel block B to be predicted. A neighbourhood is a vector of N values, each value corresponding to the value of a pixel belonging to this neighbourhood. The invention is in no way limited to this definition of neighbourhood but instead extends to any definition of causal neighbourhood that is to say to any neighbourhood which is available at a decoder prior to decoding the current block to be predicted.

Figure 2:
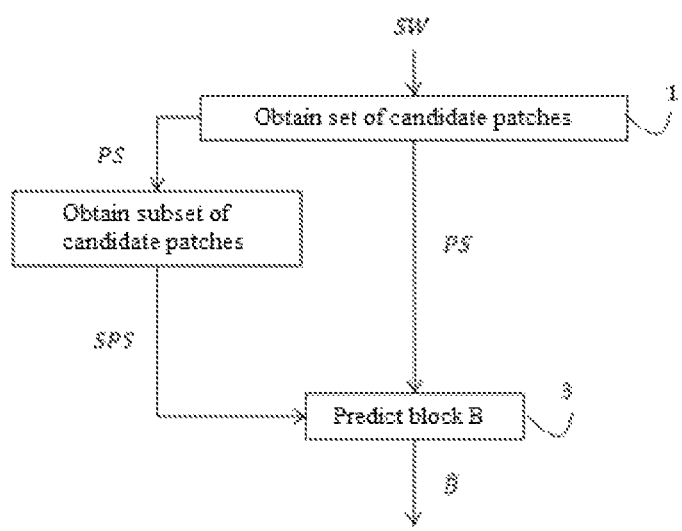
FIG. 2 shows a diagram of the steps of the method for predicting a pixel block of an image according to the present invention.

FIG. 2 shows a diagram of the steps of the method for predicting a pixel block of an image of an image sequence.

According to this method, a pixel block B of a current image $I_c$ is predicted using a weighted sum of pixel blocks belonging to patches of a dictionary from a set of candidate patches PS.

According to this method, the set of candidate patches PS is formed of at least one candidate patch $X_k$ belonging to a search window SW which is defined over one or more images (step 1). The search window SW can be defined over a single image in the form of a spatial region but can also have a temporal character that is to say defined over several images of an image sequence which may or may not be temporally consecutive.

For example, this search window SW is defined in FIG. 1, on one hand, by a zone of an image $I_{c-1}$ temporally previous to image $I_c$ (to which belongs the pixel block to be predicted), said zone being centred around patch X (whose co-located patch is shown in this image by a dotted line) and, on the other hand, by a zone of another image $I_{c+1}$ temporally subsequent to image $I_c$. Through this example, it can be understood that the search window SW can be composed of one or more zone(s), each zone can be defined around a co-located patch of this patch X, possibly centred around it, and that these zones can be situated in different images previous and/or subsequent to the image to which belongs the block to be predicted.

According to the method, a subset of candidate patches SPS is obtained from the set of candidate patches PS (step 2).

According to an embodiment, the patches $X_k$ of the subset of candidate patches SPS are randomly chosen from among the candidate patches of the set of candidate patches PS.

According to another embodiment, each patch $X_k$ of the subset of candidate patches SPS is chosen so that its neighbourhood $V_k$ is close, in terms of content, to the neighbourhood V of patch X.

In mathematical terms, a patch $X_k$ of the subset of candidate patches SPS is such that it satisfies equation (1):

$$\min_k \|V - V_k\|_2^2 \tag{1}$$

Thus, the subset of candidate patches SPS groups together N candidate patches which minimise the Euclidean norm given in equation (1). Distances other than the Euclidean norm can be used without leaving the scope of the invention.

The number N is an integer much less than the total number of candidate patches of the search window SW. A compromise is, however, reached for determining this number N which must be sufficiently large to have a sufficient variety in the contents of the candidate patches to obtain a good prediction while ensuring that the dynamic range of an index referencing one of these N patches is not too large that it leads to an excessive coding cost.

According to the method, at least one dictionary $D^l (l \geq 1)$ is formed of a patch $X_0$, called the first patch, of the subset of candidate patches SPS and at least one other patch $X_k$ ($1 \leq k < K$), called the second patch, of the set of candidate patches PS.

According to a variant, each dictionary $D^l$ groups together a patch randomly chosen from among those of the subset of candidate patches SPS and at least one patch randomly chosen from among those of the set of candidate patches PS.

According to a variant, the first patch $X_0$, called the first patch, of a dictionary $D^l$ is chosen from among those of the subset of candidate patches SPS, that is to say that this first patch is chosen so that its neighbourhood is close, in terms of content, to neighbourhood V.

According to a variant, which is preferentially combined with the preceding one, each second patch $X_k$ of a dictionary $D^l$ is chosen from among those of the set of candidate patches PS, so that it is close, in terms of content, to the first patch $X_0$ of this dictionary $D^l$.

The proximity of contents between neighbourhoods or patches is advantageous in terms of coding as it limits the dynamic range of the block of residual errors resulting from the prediction of the block to be predicted. This proximity of contents is quantified by a distance calculated between the values of the pixels of these neighbourhoods or these patches. This distance is, for example, the sum of the absolute distances between the pixels of these two neighbourhoods or patches. However, the invention is not limited to the use of a particular distance.

The number L of dictionaries and the number of patches per dictionary are values known a priori.

According to a variant, the number K of patches in each dictionary is common to all dictionaries.

According to a variant, the number K is variable according to the block to be predicted.

In this case, this number K can be optimised for each block to be predicted. It is then necessary, in a context of transmission between transmitter/receiver, to transmit this number to the receiver for each block to be predicted.

According to the method, block B is predicted using a weighted sum of pixel blocks belonging to patches of a dictionary $D^l$ (step 3).

For this purpose, for each dictionary $D^l$ a prediction of the causal neighbourhood V of the block to be predicted B is determined using a weighted linear combination of neighbourhoods $V_k$ of patches $X_k$ of this dictionary; weighting parameters which optimise the prediction are chosen.

In mathematical terms, the prediction of the causal neighbourhood V of the block to be predicted B using a weighted linear combination of neighbourhoods $V_k$ of patches $X_k$ ($0 \leq k < K$) of a dictionary $D^l$ consists in determining weighting parameters $W_m$ where $m \in \{0; K-1\}$ which minimise a distance between the weighted values of pixels of neighbourhoods $V_k$ of patches of this dictionary $D^l$ and the values of pixels of neighbourhood V.

According to an embodiment, this distance is expressed in Euclidean space by a minimisation, in the sense of least squares, expressed by equation (2):

$$\text{opt} = \arg\min_m \|V - A^l W_m^l\|_2^2 \text{ under the constraint } \Sigma_m W_m^l = 1 \tag{2}$$

where $A^l$ is a matrix of dimension M×K which groups together the values of the pixels of K neighbourhoods $V_k$ of patches of dictionary $D^l$; the M pixel values of each neighbourhood are grouped together to form a column of this matrix.

K weighting parameters are thus optimised, in practice by equation (3):

$$W_{opt}^l = \frac{CO_l^{-1} * I}{I^T * CO_l^{-1} * I} \tag{3}$$

where $CO_l$ is a local covariance matrix (with reference to neighbourhood V) of values of pixels of matrix $A^l$ and I is a unit column vector.

The K optimal weighting parameters $W_{opt}^l$ are therefore obtained to predict neighbourhood V using a linear combination of K neighbourhoods $V_k$ of dictionary $D^l$.

According to an embodiment, L dictionaries $D_l$ where $l \in \{0; L-1\}$ having been considered and weighting parameters $W_{opt}^l$ having been determined for each of these dictionaries, the weighting parameters W used to predict block B are those which provide the closest prediction, according to a criterion, to said pixel block to be predicted.

According to an embodiment, this criterion is a square error between the reconstructed predicted block (after coding and decoding) and the block to be predicted.

In mathematical terms, the optimal weighting parameters W are then those given by equation (4):

$$\min_l \|B - A^l W_{opt}^l\|_2^2 \text{ under the constraint } \Sigma_m W_{opt}^l = 1 \tag{4}$$

According to another embodiment, the criterion used is a rate-distortion criterion particularly suitable for the context of video compression.

In mathematical terms, the optimal weighting parameters W are then those given by equation (5):

$$\min_l (SSE^l + \lambda R^l) \tag{5}$$

where $SSE^l$ is a measure in the sense of least squares of the reconstruction error between the pixel block to be predicted and the reconstructed predicted block (decoded block), $R^l$ is the cost of coding the block (prediction error and other syntax elements), and $\lambda$ is the Lagrangian.

According to the method in the case where a single dictionary is used, block B is predicted using a weighted linear combination of pixels of blocks $B_k$ of patches $X_k$ of dictionary $D^l$ and the weighting parameters $W_{opt}^l$ are those which were previously determined in equation (3).

In the case where several dictionaries are used, block B is predicted using a weighted linear combination of pixels of block $B_k$ of patches $X_k$. The weighting parameters used to predict the block to be predicted are the parameters W given by equation (4) and the dictionary from which originates the prediction of block B is then that which corresponds to these weighting parameters used.

In mathematical terms, the prediction $\hat{B}$ of block B is given by equation (6):

$$\hat{B} = A * W \qquad (6)$$

where A is a matrix of dimension P×K which groups together the P values of the pixels of the K blocks $B_k$, and W are the chosen weighting parameters.

In a context of transmission between a transmitter and a receiver, no specific information is to be transmitted to the receiver (decoder) to predict block B in the case where the number of parameters to be used is previously known by the decoder and in the case of a single dictionary constructed solely on the basis of neighbourhood. In fact, the prediction method can be implemented by the receiver without specific information as, on one hand, the neighbourhoods used by the prediction are causal, which enables the receiver to find the blocks of the patches to reconstruct matrix A and, on the other hand, by implementing the prediction of neighbourhood V; the K weighting parameters obtained in this case are identical to those (W) obtained during the sub-step of predicting the neighbourhood implemented in this case by the transmitter (coder).

It can thus be understood that a coding method implementing this prediction method provides significant coding gains compared with traditional techniques of inter-image coding such as those used for example in H.264/AVC.

If several dictionaries are used, a specific item of information which identifies the first patch of the dictionary chosen by the coder must be known by a decoder to reconstruct the block to be predicted. For this purpose, a signal is transmitted carrying a specific item of information which identifies the position of the first patch of the dictionary from which originates the prediction of the pixel block to be predicted.

According to an embodiment, the position of an image of a first patch $X_0$ of a dictionary $D^l$ is given by an item of displacement information $\vec{d}_l$ defined from patch X.

The item of displacement information $\vec{d}_l$ can, according to an embodiment, be obtained by a known block matching method which makes it possible to determine a displacement of a first patch with respect to patch X by considering a patch as a block in this block matching method.

The item of displacement information must be transmitted to the decoder in order that this decoder can determine which was the first patch used. It is not necessary to transmit other information to determine the other patches of the dictionary as the decoder is able to determine them by implementing similar operations to those described above.

It can thus be understood that a coding method implementing this prediction method using several dictionaries also provides significant coding gains compared with traditional techniques of inter-image coding such as those used for example in H.264/AVC.

Figure 3:
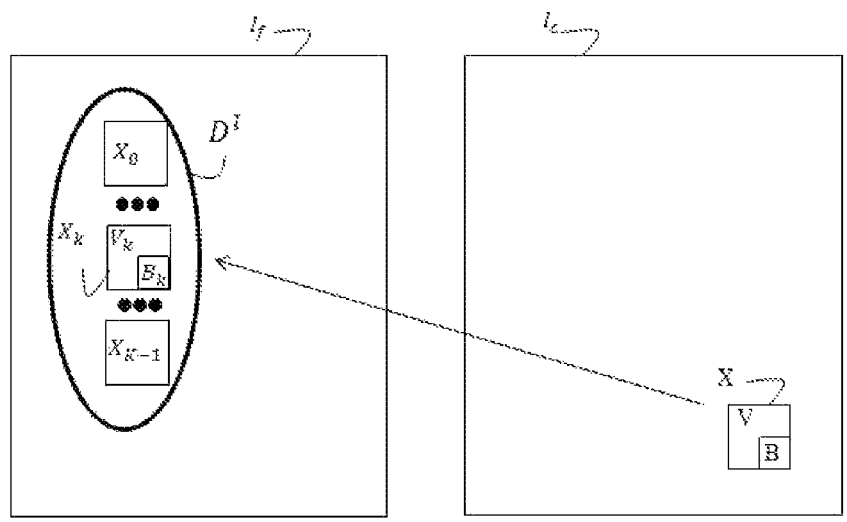
FIG. 3 shows the case where the patches of a dictionary belong to a same image.

According to an embodiment, shown by FIG. 3, the K patches $X_k$ where $k \in \{0; K-1\}$ of a dictionary $D^l$ are all situated in a same image $I_f$ other than current image $I_c$. Image $I_f$ can be temporally previous or subsequent to image $I_c$ when these two images belong to a same image sequence.

Figure 4:
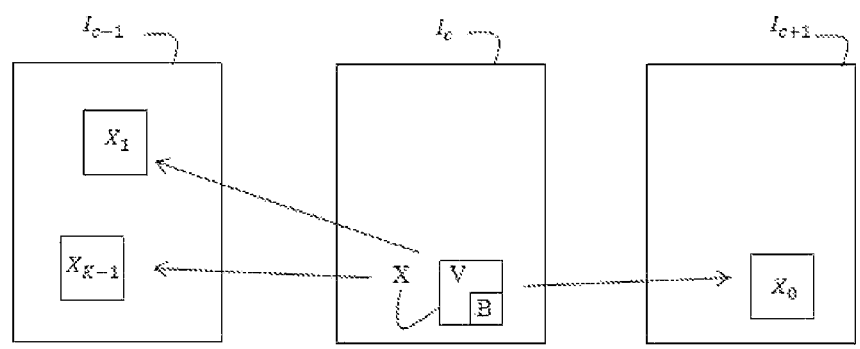
FIG. 4 shows the case where the patches of a dictionary do not all belong to a same image.

According to an embodiment, shown by FIG. 4, the K patches $X_k$ where $k \in \{0; K-1\}$ of a dictionary $D^l$ are situated in different images. According to the example of FIG. 4, dictionary $D^l$ comprises (K−1) patches $X_1, \ldots, X_{K-1}$ in an image $I_{c-1}$ temporally previous to current image $I_c$ and a patch $X_0$ in an image $I_{c+1}$ temporally subsequent to current image $I_c$.

This embodiment is advantageous as it makes it possible to increase the possibilities of patches in a same dictionary which can thus belong to different images. This makes it possible to decrease further the prediction error for the block to be predicted as the method then benefits from temporal redundancies between images of a same video.

These two embodiments, shown by FIGS. 3 and 4, in no way limit the definition of a dictionary. They have been given to show that a dictionary can be formed by patches situated in one or more images other than that to which belongs the block to be predicted.

Figure 5:
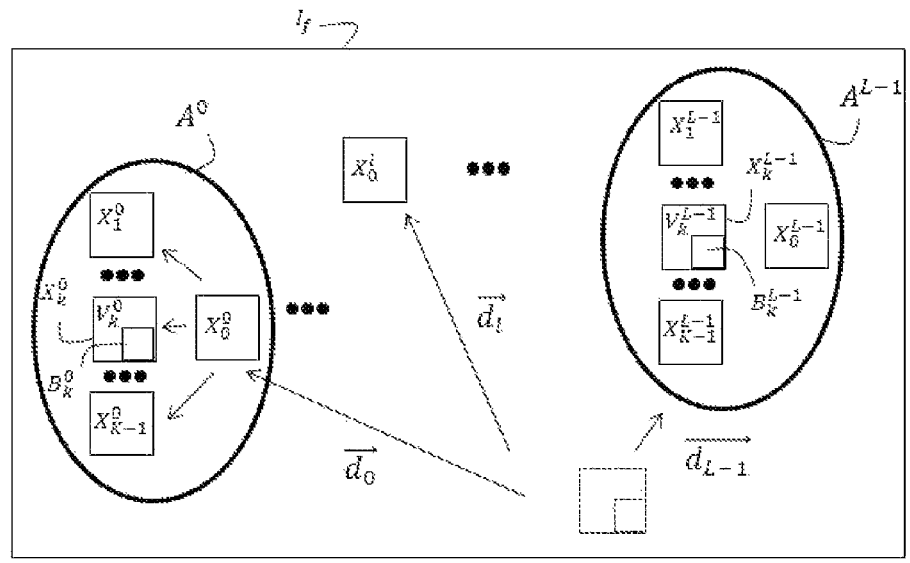
FIG. 5 shows the case where dictionaries are defined from the first patch.

FIG. 5 shows the case where L dictionaries have been defined, each from a first patch. It can thus be seen that each of the L first patches $X_0^l$ where $l \in \{0; L-1\}$ are obtained from the displacement of patch X (or more precisely, virtually from its co-located patch X' in image $I_f$).

Each displacement is expressed in the form of a vector $\vec{d}_l$.

Figure 6:
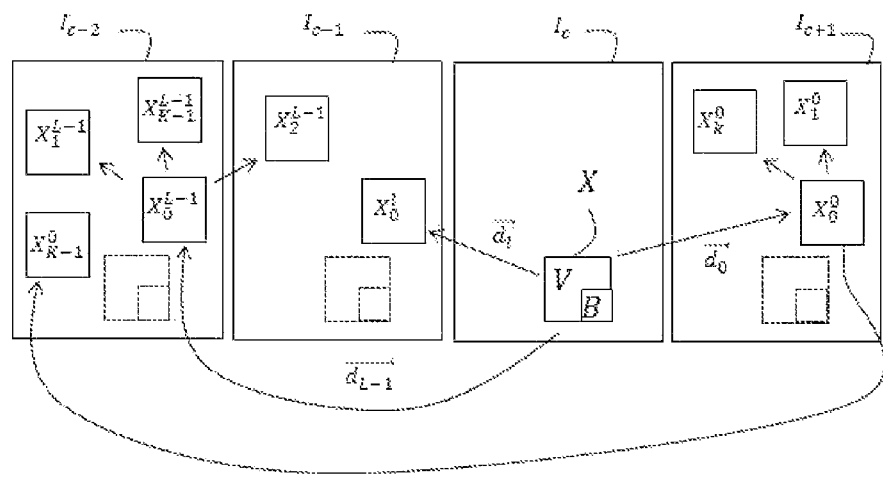
FIG. 6 shows the case where patches of a dictionary do not all belong to a same image.

FIG. 6 shows the case where dictionary patches do not all belong to the same image $I_f$. It can be noted that an image $I_{c+1}$ does not temporally precede current image $I_c$ during decoding of this current image. According to this example, dictionary $D_0$ is formed of a first patch $X_0^0$ belonging to image $I_{c+1}$ and patches which do not all belong to image $I_{c+1}$. For example, a patch $X_{K-1}^0$ belongs to image $I_{c-2}$. Likewise, dictionary $D_{L-1}$ is formed of a first patch $X_0^{L-1}$ belonging to image $I_{c-2}$ and patches which do not all belong to image $I_{c-2}$. For example, a patch $X_2^{L-1}$ belongs to image $I_{c-1}$.

Through these examples, it can be understood that the distance which quantifies the proximity of the contents of two patches is to be understood in the widest sense as it can be defined to quantify the resemblance between patches which do not necessarily belong to a same image.

FIG. 7 shows an example of the architecture of a device comprising means configured to implement the invention described in relation to FIGS. 1 to 6.

Device 700 comprises the following elements, interconnected by a digital address and data bus 701:
- A calculation unit 703 (also called a central processing unit);
- A memory 705;
- A network interface 704, for interconnections between device 700 and other remote devices connected via a connection 702;

The calculation unit 703 can be implemented by a (possibly dedicated) microprocessor, a (possibly also dedicated) microcontroller, etc. The memory 705 can be implemented in a volatile and/or non-volatile form such as a RAM (random access memory), a hard disc, an EPROM (erasable programmable ROM), etc.

Means 703, 705 and possibly 704 cooperate with each other to predict a pixel block using a weighted sum of pixel blocks belonging to patches of a dictionary from a set of candidate patches, each patch being formed of a pixel block of an image and a causal neighbourhood of this pixel block.

Means 703, 705 and possibly 704 also cooperate with each other to obtain a subset of candidate patches from the set of candidate patches and to form at least one dictionary from a patch of the subset of candidate patches and at least one other patch of said set of candidate patches.

The means of the device are configured to implement a method described in relation to FIGS. 1 to 6.

According to an embodiment of device 700, means 704 are configured to transmit and/or receive a signal whose frame carries an item of information which identifies the position of the first patch of the dictionary from which originates the prediction of the pixel block to be predicted.

The invention also relates to a method for coding and/or decoding an image sequence during which a prediction block is calculated from a reference image block. The method is characterised in that the prediction block is calculated according to a method described in relation to FIGS. 1 to 6.

The invention also relates to an apparatus for coding and/or decoding an image sequence which is characterised in that it comprises a device described in relation to FIG. 7.

In FIG. 7, the modules shown are functional units that may or may not correspond to physically distinguishable units. For example, these modules or some of them can be grouped together in a single component or circuit, or constitute functions of the same software. On the contrary, some modules may be composed of separate physical entities. The inter-image prediction devices compatible with the invention are implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

The invention claimed is:

1. A method for predicting a pixel block of an image using a weighted sum of pixel blocks belonging to patches of a dictionary ($D^f$) from a set of candidate patches (PS), each patch being formed of a pixel block of an image and a causal neighbourhood of this pixel block, the method comprising:
    obtaining a subset of candidate patches (SPS) from the set of candidate patches (PS);
    forming the dictionary ($D^f$) from a patch, denoted a first patch, belonging to the subset of candidate patches (SPS) and at least one other patch, denoted a second patch, belonging to said set of candidate patches (PS);
    using a weighted linear combination of causal neighborhoods of said patches of said dictionary for predicting the causal neighborhood of the pixel block to be predicted;
    using the weighting parameters of said linear combination chosen during the prediction of the causal neighborhood to predict the pixel block.

2. The method according to claim 1, further comprising selecting the first patch for reducing a distance between said neighborhood of the first patch and the neighborhood of the patch that includes the block to be predicted.

3. The method according to claim 1 further comprising selecting each said second patch of the dictionary to reduce a distance between each said second patch and the first patch of said dictionary.

4. The method according to claim 1 further comprising selecting each candidate patch of said dictionary to reduce a distance between its neighborhood and the neighborhood of the patch comprising the bock to be predicted.

5. The method according to claim 1, wherein the position in an image of a first patch of a dictionary is given by an item of displacement information defined from the patch formed of the block to be predicted and its causal neighborhood.

6. A method for encoding an image sequence during which a prediction block is calculated from an image pixel block, the prediction block being calculated according to a method of claim 1.

7. A method for decoding an image sequence during which a prediction block is calculated from an image pixel block, the prediction block being calculated according to the method of claim 1.

8. A device for decoding an image sequence during which a prediction block is calculated from an image pixel block, the prediction block being calculated according to the method of claim 7.

9. A device for predicting a pixel block of an image configured to predict said block using a weighted sum of pixel blocks belonging to patches of a dictionary from a set of candidate patches, each patch being formed of a pixel block of an image and a causal neighborhood of this pixel block, the device comprising a processor configured to:
    obtain a subset of candidate patches from the set of candidate patches;
    form at least one dictionary from a patch of the subset of candidate patches and at least one other patch of said set of candidate patches, and
    use a weighted linear combination of causal neighborhoods of said patches of said dictionary to predict the causal neighborhood of the pixel block to be predicted;
    using the weighting parameters of said linear combination chosen during the prediction of the causal neighborhood to predict the pixel block.

10. The device according to claim 9, further comprising a transmitter for transmitting a signal intended to be transmitted or received by said device, wherein the signal carries an item of information identifying the position of the first patch of the dictionary from which originates the prediction of the pixel block to be predicted.

11. The device according to claim 9, further comprising selects the first patch for reducing a first distance between said neighborhood of the first patch and the neighborhood of the second patch that includes the block to be predicted.

12. The device according to claim 9, further comprising selects each said second patch of the dictionary to reduce a second distance between each said second patch and the first patch of said dictionary.

13. The device according to claim 8, further comprising selects each candidate patch of said dictionary to reduce a third distance between its neighborhood and the neighborhood of the patch comprising the block to be predicted.

14. The device according to claim 9, wherein the position in an image of a first patch of a dictionary is given by an item of displacement information defined from the patch formed of the block to be predicted and its causal neighborhood.

15. The device according to claim 9, further comprising a receiver for receiving a signal intended to be transmitted or received by said device, wherein the signal carries an item of information identifying the position of the first patch of the dictionary from which originates the prediction of the pixel block to be predicted.

* * * * *